(12) United States Patent  (10) Patent No.: US 9,046,140 B2
Davis  (45) Date of Patent: Jun. 2, 2015

(54) CONICAL WEDGE ONE-WAY CLUTCH WITH SPLIT OUTER RACE

(71) Applicant: Schaeffler Technologies AG & Co. KG, Herzogenaurach (DE)

(72) Inventor: Michael C. Davis, Sterling, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/049,492

(22) Filed: Oct. 9, 2013

(65) Prior Publication Data

US 2014/0110207 A1   Apr. 24, 2014

Related U.S. Application Data

(60) Provisional application No. 61/715,518, filed on Oct. 18, 2012.

(51) Int. Cl.
| | |
|---|---|
| *F16D 41/063* | (2006.01) |
| *F16H 45/00* | (2006.01) |
| *F16D 41/06* | (2006.01) |
| *F16D 41/08* | (2006.01) |
| *F16H 41/24* | (2006.01) |
| *F16D 23/12* | (2006.01) |

(52) U.S. Cl.
 CPC .............. *F16D 41/06* (2013.01); *F16D 41/08* (2013.01); *F16D 2023/123* (2013.01); *F16H 41/24* (2013.01); *F16H 2041/246* (2013.01)

(58) Field of Classification Search
 None
 See application file for complete search history.

(56) References Cited

U.S. PATENT DOCUMENTS

| | | | |
|---|---|---|---|
| 3,202,250 A | 8/1965 | Fulton | |
| 8,033,371 B2 | 10/2011 | Davis | |
| 2008/0277228 A1 | 11/2008 | George | |
| 2009/0159390 A1 | 6/2009 | Davis | |
| 2009/0277742 A1* | 11/2009 | Samie | 192/70.28 |
| 2013/0230385 A1* | 9/2013 | Lindemann et al. | 415/122.1 |

FOREIGN PATENT DOCUMENTS

| | | |
|---|---|---|
| EP | 0015674 B1 | 5/1984 |
| JP | 2002317828 A | 10/2002 |

OTHER PUBLICATIONS

International Search Report for PCT/US2013/065172, mailed Jan. 22, 2014 by the Korean Intellectual Property Office.

\* cited by examiner

*Primary Examiner* — Stefanos Karmis
*Assistant Examiner* — Alberto Interian, III
(74) *Attorney, Agent, or Firm* — Simpson & Simpson, PLLC

(57) ABSTRACT

A one-way clutch, including an inner race and a wedge component with first and second tapered outer partially circumferential surfaces. The clutch includes first and second outer races including respective tapered inner partially circumferential surfaces. For rotation of the outer races, with respect to the inner race, in a first direction, the outer races are axially aligned and separated by a space in an axial direction, the first and second tapered outer partially circumferential surfaces and the respective tapered inner partially circumferential surfaces are at least partially aligned in radial and axial directions and are free of contact. For rotation of the outer races, with respect to the inner race, in a second direction, opposite the first direction, the first and second tapered outer partially circumferential surfaces contact the respective tapered inner partially circumferential surfaces and the first and second outer races are non-rotatably connected to the inner race.

19 Claims, 8 Drawing Sheets

PRIOR ART

Fig. 8

CONICAL WEDGE ONE-WAY CLUTCH WITH SPLIT OUTER RACE

CROSS-REFERENCE TO RELATED APPLICATIONS

This application claims the benefit of U.S. Provisional Patent Application No. 61/715,518, filed Oct. 18, 2012, which application is incorporated herein by reference in its entirety.

TECHNICAL FIELD

The present disclosure relates to a one-way clutch using wedge plates to lock inner and outer races. In particular, the one-way clutch eliminates torque drag between the inner and outer races in a free-wheel mode while enabling rapid and consistent switching to a locking mode from the free-wheel mode.

BACKGROUND

For a one-way clutch it is known to use wedge plates, forming a cone-shaped outer circumferential surface disposed within a groove for an outer race, to rotationally connect the outer race with an inner race. To enable a consistent transition from a free-wheel mode to a locking mode, it is necessary to maintain some frictional contact between the cone-shaped outer circumferential surface and the groove during the free-wheel mode. The frictional contact results in torque drag between the inner and outer races and subsequent energy dissipation and decrease in efficiency during operation in free-wheel mode.

Figure 8:
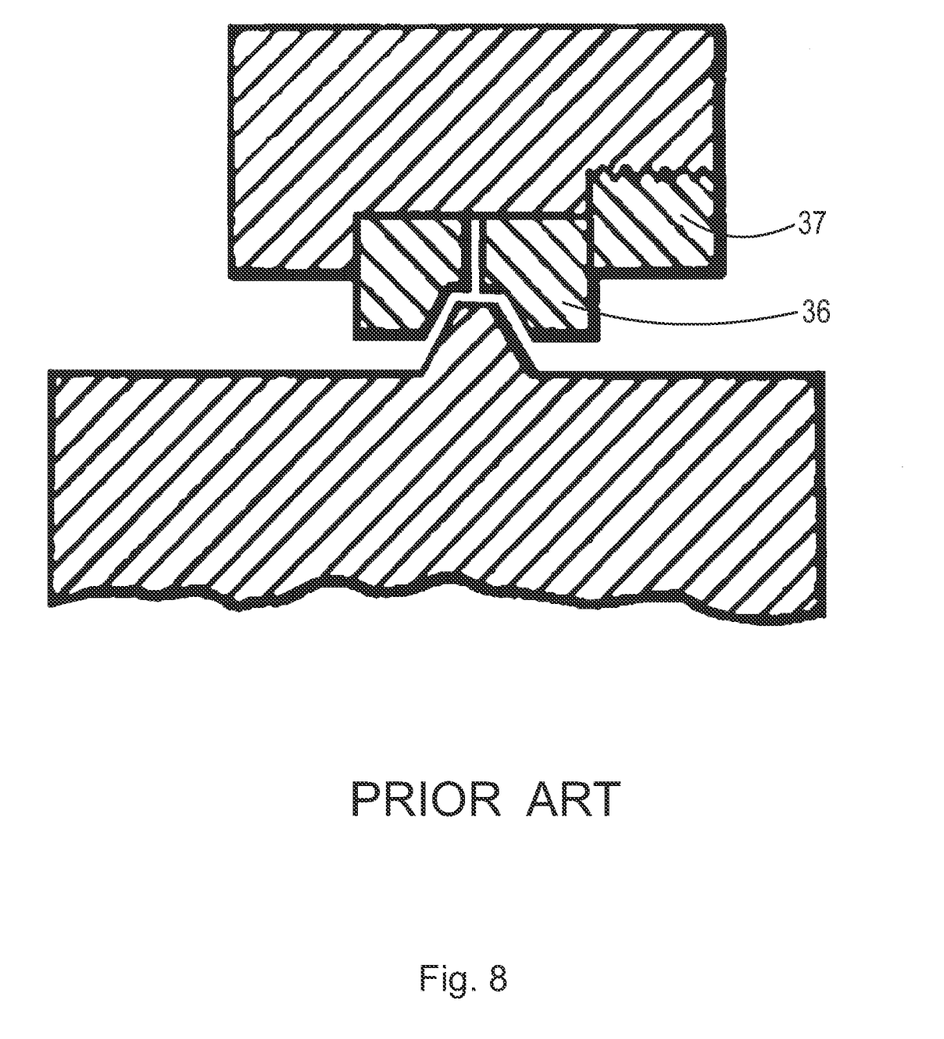

FIG. 8 is a partial cross-sectional view of a prior art one-way clutch. FIG. 8 is taken from FIG. 10 of U.S. Pat. No. 3,202,250. FIG. 8 shows split outer race 36 for a one-way clutch. The two portions of race 36 are axially fixed by screw 37. The one-way clutch described in U.S. Pat. No. 3,202,250 operates with drag torque between wedge elements, radially located between inner and outer races, during free-wheel mode.

SUMMARY

According to aspects illustrated herein, there is provided a one-way clutch, including an inner race and a wedge component with first and second radially disposed sides, respectively, facing away from each other in first and second opposite axial directions; a first inner partially circumferential surface engaged with the inner race; and first and second outer partially circumferential surfaces: facing partially in a first radial direction and partially in the first or second axial direction; and tapering radially outward from the first and second radially disposed sides, respectively. The clutch includes first and second axially displaceable outer races including: third and fourth radially disposed sides, respectively, facing in the second and first axial directions, respectively; and second and third inner partially circumferential surfaces, respectively: facing partially in a second radial direction and partially in the first or second axial direction; and tapering radially inward from the third and fourth radially disposed sides, respectively. For rotation of the first and second outer races, with respect to the inner race, in a first rotational direction: the first and second outer races are axially aligned and separated by a space in an axial direction; the first outer partially circumferential surface and the second inner partially circumferential surface are at least partially aligned in radial and axial directions; and the first and second outer partially circumferential surfaces and the second and third inner partially circumferential surfaces, respectively, are free of contact. For rotation of the first and second outer races, with respect to the inner race, in a second rotational direction, opposite the first rotational direction: the first and second outer partially circumferential surfaces contact the second and third inner partially circumferential surfaces; and the first and second outer races are non-rotatably connected to the inner race.

According to aspects illustrated herein, there is provided a one-way clutch, including: a first side plate; an inner race; and a wedge component with: first and second radially disposed sides, respectively, facing away from each other in first and second opposite axial directions; a first inner circumferential surface engaged with the inner race; and first and second outer partially circumferential surfaces: facing partially in a first radial direction and partially in the first or second axial direction; and tapering radially outward from the first and second radially disposed sides, respectively. The clutch includes first and second axially displaceable outer races including: respective portions located radially outward of the inner race; third and fourth radially disposed sides, respectively, facing in the second and first axial directions, respectively; and second and third inner partially circumferential surfaces, respectively: facing partially in a second radial direction and partially in the first or second axial direction; and tapering radially inward from the third and fourth radially disposed sides, respectively. For rotation of the first and second outer races, with respect to the inner race, in a first rotational direction, the first and second outer partially circumferential surfaces and the second and third inner partially circumferential surfaces, respectively, are free of contact. For rotation of the first and second outer races, with respect to the inner race, in a second rotational direction, opposite the first rotational direction, the first side plate urges the first outer race axially toward the second outer race such that: the first and second outer partially circumferential surfaces and the second and third inner partially circumferential surfaces are in contact; the wedge component rotates with respect to the inner race; and the wedge component displaces radially outward to rotationally lock the inner race to the first and second outer races.

According to aspects illustrated herein, there is provided a one-way clutch, including: first and second side plates; an inner race; and first and second wedge plates with: first and second radially disposed sides, respectively, facing away from each other in opposite axial directions; first and second inner partially circumferential surfaces, respectively, engaged with the inner race; and first and second outer partially circumferential surfaces, respectively: facing partially in a first radial direction and partially in the first or second axial direction; and tapering radially outward from the first and second radially disposed sides, respectively. The clutch includes first and second axially displaceable outer races axially located between the first and second side plates and including: is respective portions located radially outward of the inner race; third and fourth radially disposed sides, respectively, facing each other in opposite axial directions; and third and fourth inner partially circumferential surfaces, respectively: facing partially in a second radial direction and partially in the first or second axial direction; and tapering radially inward from the third and fourth radially disposed sides, respectively. For rotation of the first and second outer races, with respect to the inner race, in a first rotational direction, the first and second outer partially circumferential surfaces and the third and fourth inner partially circumferential surfaces, respectively, are free of contact. For rotation of the first and second outer races, with respect to the inner race, in a second rotational direction, opposite the first rotational direction, the first side plate urges the first outer race in the second axial direction such that: the first and second outer partially circumferential surfaces contact the third and fourth inner partially circumferential surfaces, respectively; the wedge component displaces radially outward to non-rotatably connect the inner race with the first and second outer races; and the radially outward displacement of the wedge component displaces the first and second outer races in the first and second axial directions, respectively.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
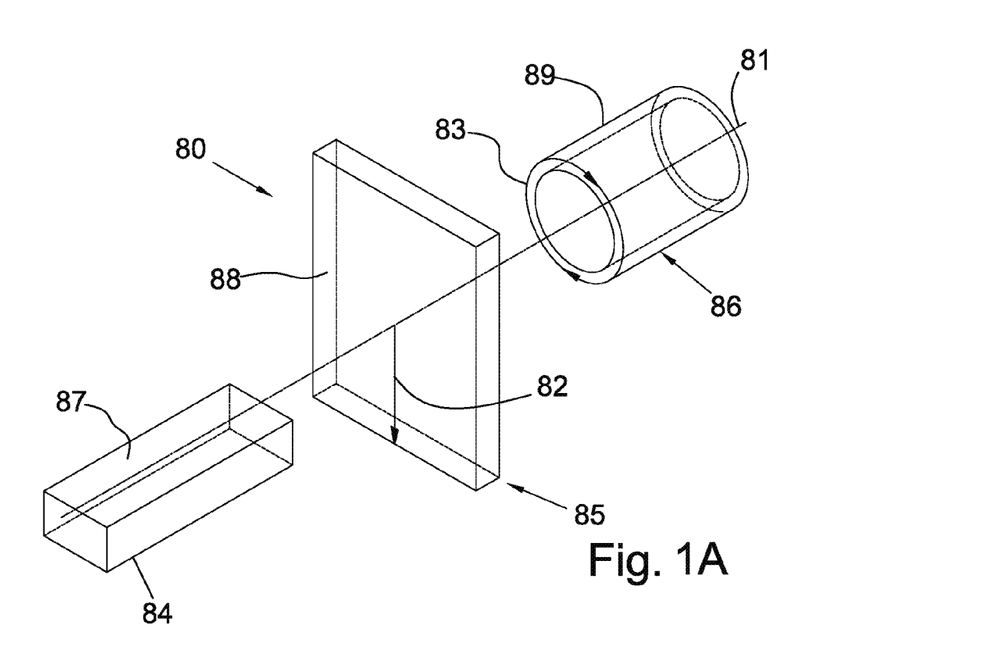
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
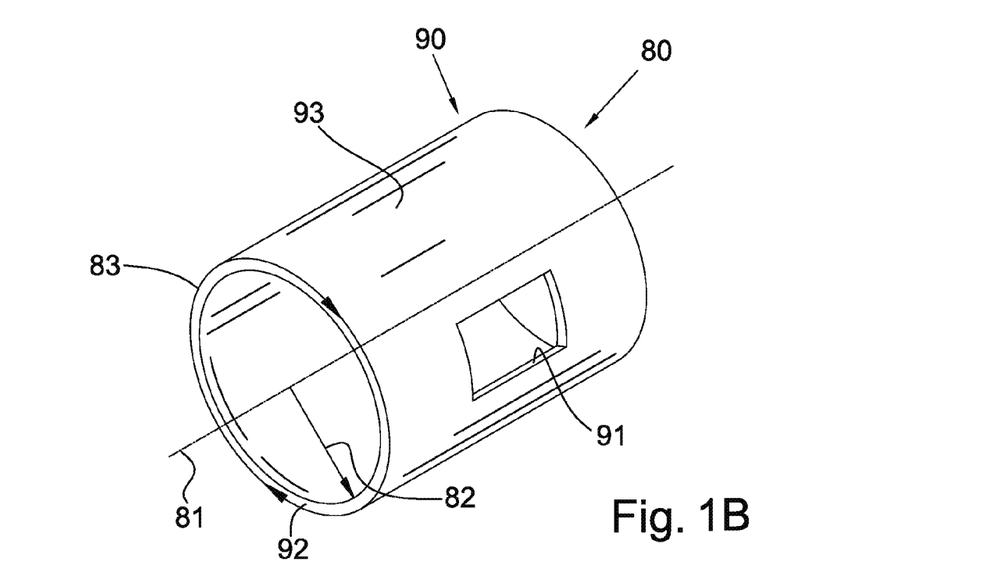
FIG. 1B is a perspective view of an object in the cylindrical coordinate system of FIG. 1A demonstrating spatial terminology used in the present application; and, FIG. 2 is an exploded perspective view of a one-way clutch with a split outer race.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
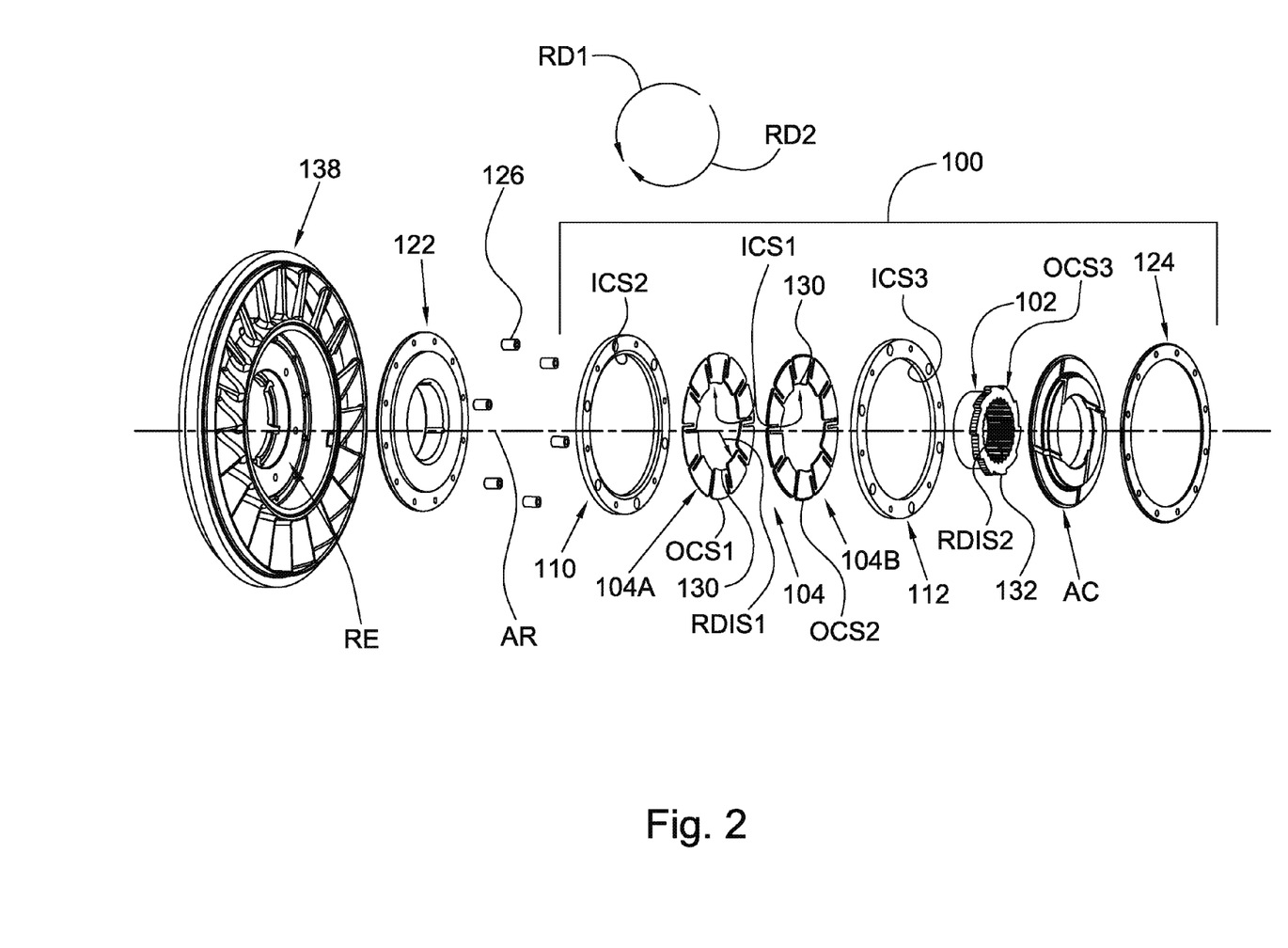

FIG. 2 is an exploded perspective view of one-way clutch 100 with a split outer race.

Figure 3:
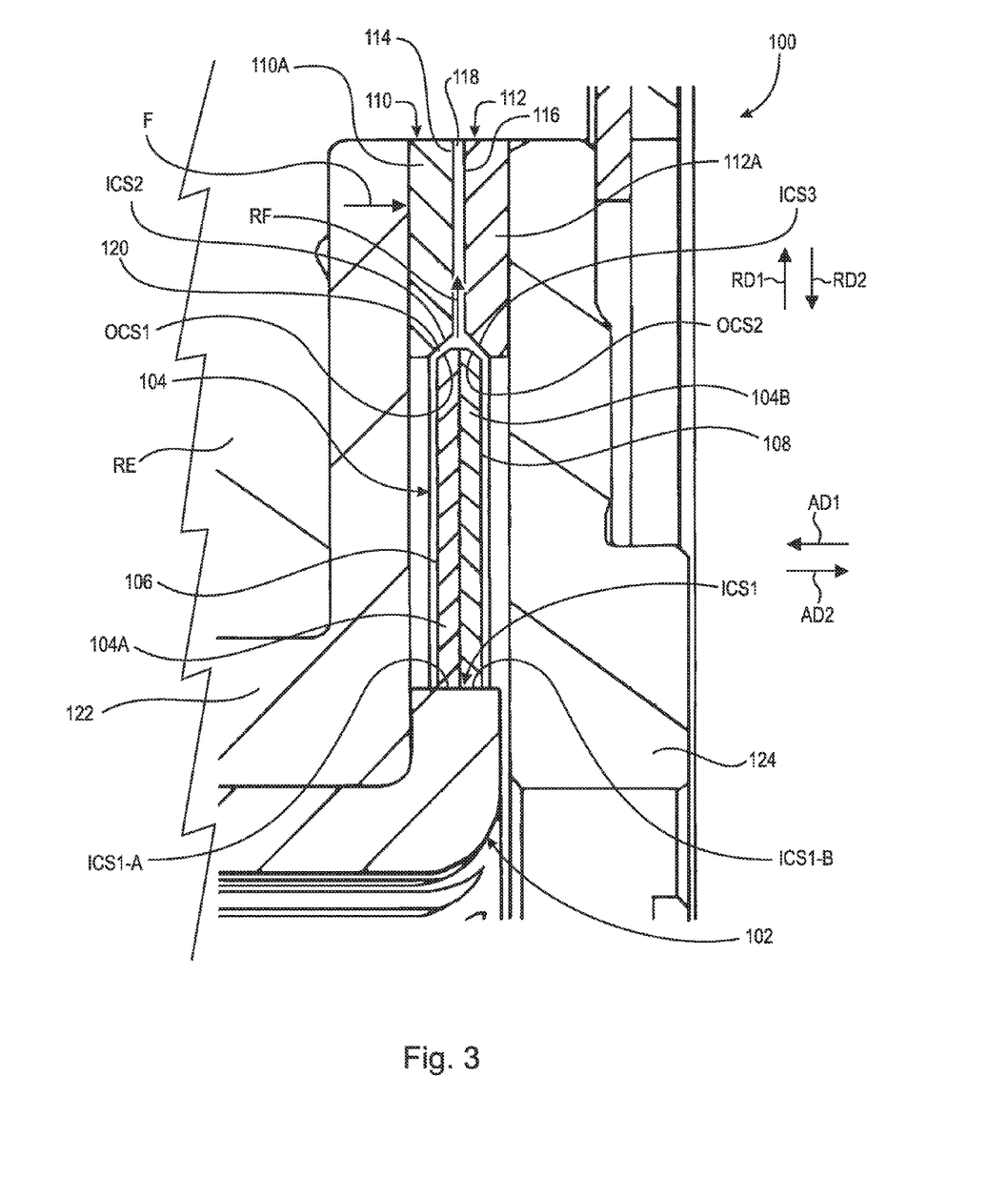
FIG. 3 is a partial cross-sectional view of a one-way clutch with a split outer race in a free-wheel mode.

FIG. 3 is a partial cross-sectional view of one-way clutch 100 with a split outer race in a free-wheel mode. The following should be viewed in light of FIGS. 2 and 3. One-way clutch 100 includes inner race 102 and wedge component 104 with radially disposed sides 106 and 108 facing away from each other in opposite axial directions AD1 and AD2, respectively. The wedge component includes inner circumferential surface ICS1 engaged with the inner race, and outer partially circumferential surfaces OCS1 and OCS2 tapering radially outward from sides 106 and 108, respectively, to form a radially outwardly extending cone-shape. By "partially circumferential" we mean that the surface faces partially in radial direction RD1 or RD2 and partially in an axial direction AD1 or AD2. OCS1 and OCS2 face partially in RD1. For the remainder of the present disclosure, the term "circumferential surface" is used when referring to OCS1, OCS2, ICS2, and ICS3. Clutch 100 includes axially displaceable outer races 110 and 112. Races 110 and 112 include portions 110A and 112A, respectively, located radially outward of the inner race. Races 110 and 112 include radially disposed sides 114 and 116, respectively, facing in directions AD2 and AD1, respectively. Races 110 and 112 include inner partially circumferential surfaces ICS2 and ICS3, respectively, tapering radially inward from the sides 114 and 116, respectively, to form a radially outwardly extending cone-shaped cavity or groove. ICS2 and ICS3 face partially in direction RD2. Thus, OCS1 and OCS2 form a conical shape and ICS2 and ICS3 form an inverse conical shape. In an example embodiment, OCS1 and ICS2 are parallel and OCS2 and ICS3 are parallel.

In a free-wheel mode for clutch 100, the outer races and the inner race are independently rotatable. That is, one or both of the outer races and the inner race are able to rotate with respect to each other. In an example embodiment, for the free-wheel mode, the outer races rotate, with respect to the inner race, in rotational direction RD1 and the outer races are axially separated by axial space 118. Also, OCS1 and ICS2 are at least partially aligned in radial and axial directions and OCS2 and ICS3 are at least partially aligned in radial and axial directions. OCS1 and ICS2 and OCS2 and ICS3, respectively, are free of contact. OCS1 and ICS2 and OCS2 and ICS3, respectively, are separated by radial space 120. That is, the outer races are able to rotate with respect to the wedge component and the inner race without any drag due to contact of OCS1 with ICS2 or OCS2 with ICS3. In FIG. 2, RD1 is counter-clockwise, due to the configuration of the wedge component and the inner race (discussed further below); however, it should be understood that the configuration of the wedge component and the inner race can be reversed such that the direction of the free-wheel mode is clockwise in direction RD2. In an example embodiment, in the free-wheel mode, one or the other of the outer races or inner race is rotationally fixed and the other of the outer races or inner race is rotatable. In an example embodiment, in the free-wheel mode, both the inner and outer races are rotatable.

Clutch 100 includes side plates 122 and 124. The inner and outer races are axially located between the side plates. Outer race 110 is rotationally and radially fixed with respect to side plate 122 and axially displaceable with respect to side plate 122. Outer race 112 is rotationally and radially fixed with respect to side plate 124 and axially displaceable with respect to side plate 124. In an example embodiment, as shown in FIG. 2, fasteners 126 are used to connect the outer races to the side plates. That is, the fasteners are connected to the side plates and pass through the outer races to rotationally and radially fix the outer races to the side plates. However, the outer races are able to axially slide along the fasteners. Additional fasteners (not shown) connect side plates 122 and 124 and outer races 110 and 112 to stator 138. In an example embodiment, fasteners 126 include a through bore and some of the additional fasteners pass through the bore. Other embodiments (not shown) may include a tooth or spline connection between the stator, side plates, and outer races.

Figure 4:
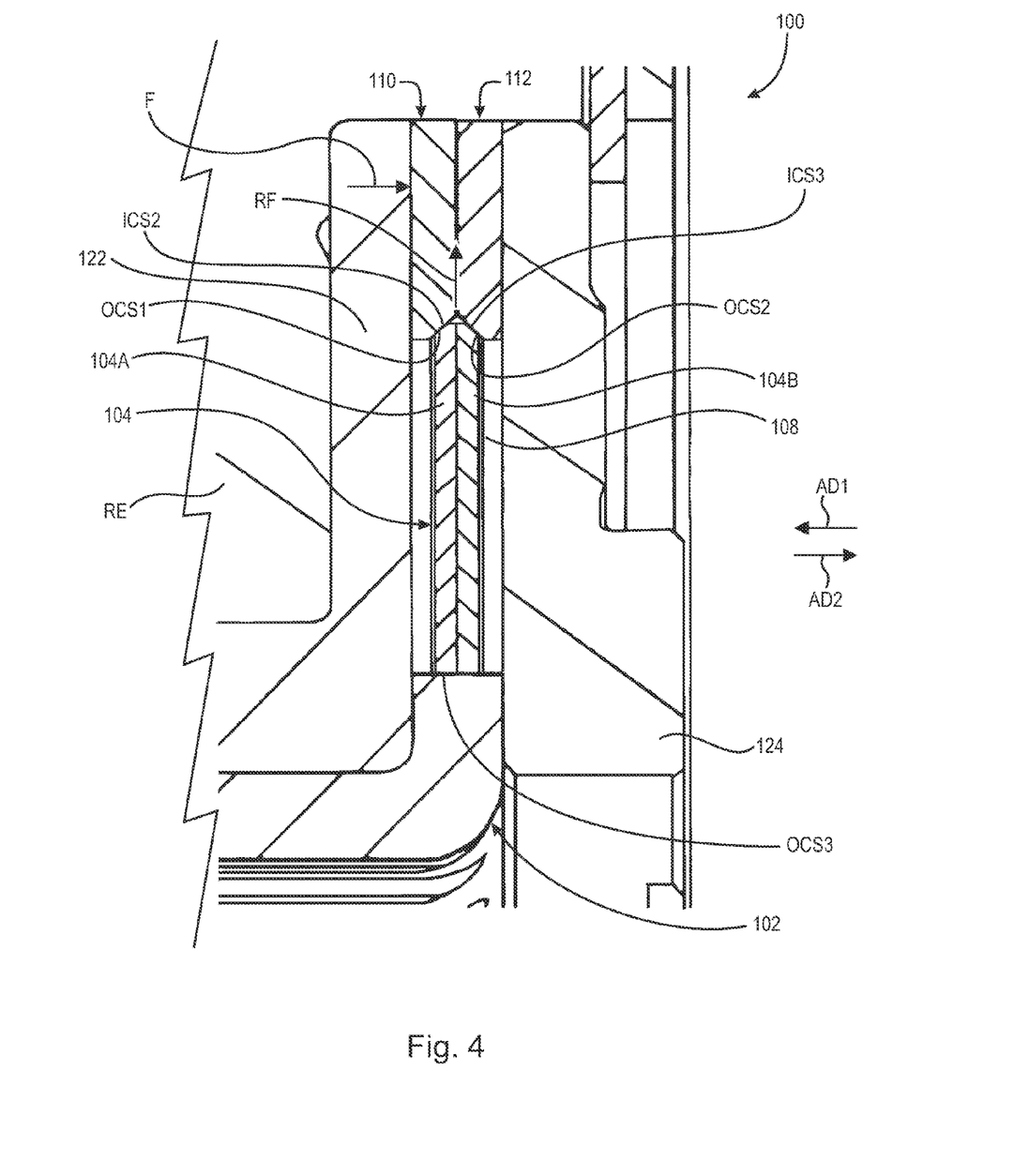
FIG. 4 is a partial cross-sectional view of the one-way clutch of FIG. 3 in an initial phase of a locking mode.

FIG. 4 is a partial cross-sectional view of one-way clutch 100 of FIG. 3 in an initial phase of a locking mode. The following should be viewed in light of FIGS. 2 through 4. In the locking mode for clutch 100, the respective rotations of the outer races and the inner race are fixed. That is, the outer races and the inner race are not able to rotate with respect to each other. To initiate the locking mode, the outer races rotate, with respect to the inner race, in a rotational direction opposite that for the free-wheel mode, in the present example, RD2, opposite direction RD1. One of the side plates, for example, side plate 122, displaces toward the outer races, for example, in direction AD2 (as further described below) applying force F. F urges the outer races toward each other, reducing space 118, such that OCS1 and OCS2 contact ICS2 and ICS3, respectively. More specifically, due to frictional engagement of OCS1 with ICS2 and OCS2 with ICS3, the wedge component moves with the outer races, for example, in direction RD1, to begin to rotate with respect to the inner race. Contact between outer circumferential surface OCS3 of the inner race and the wedge component causes the wedge component to displace radially outward (as further described below) to exert radially outward radial force RF on the outer races to increase frictional forces between OCS1 and ICS2 and OCS2 and ICS3, respectively, to begin locking respective rotations of the wedge component and the outer races, and subsequently, respective rotations of the inner and outer races.

Figure 5:
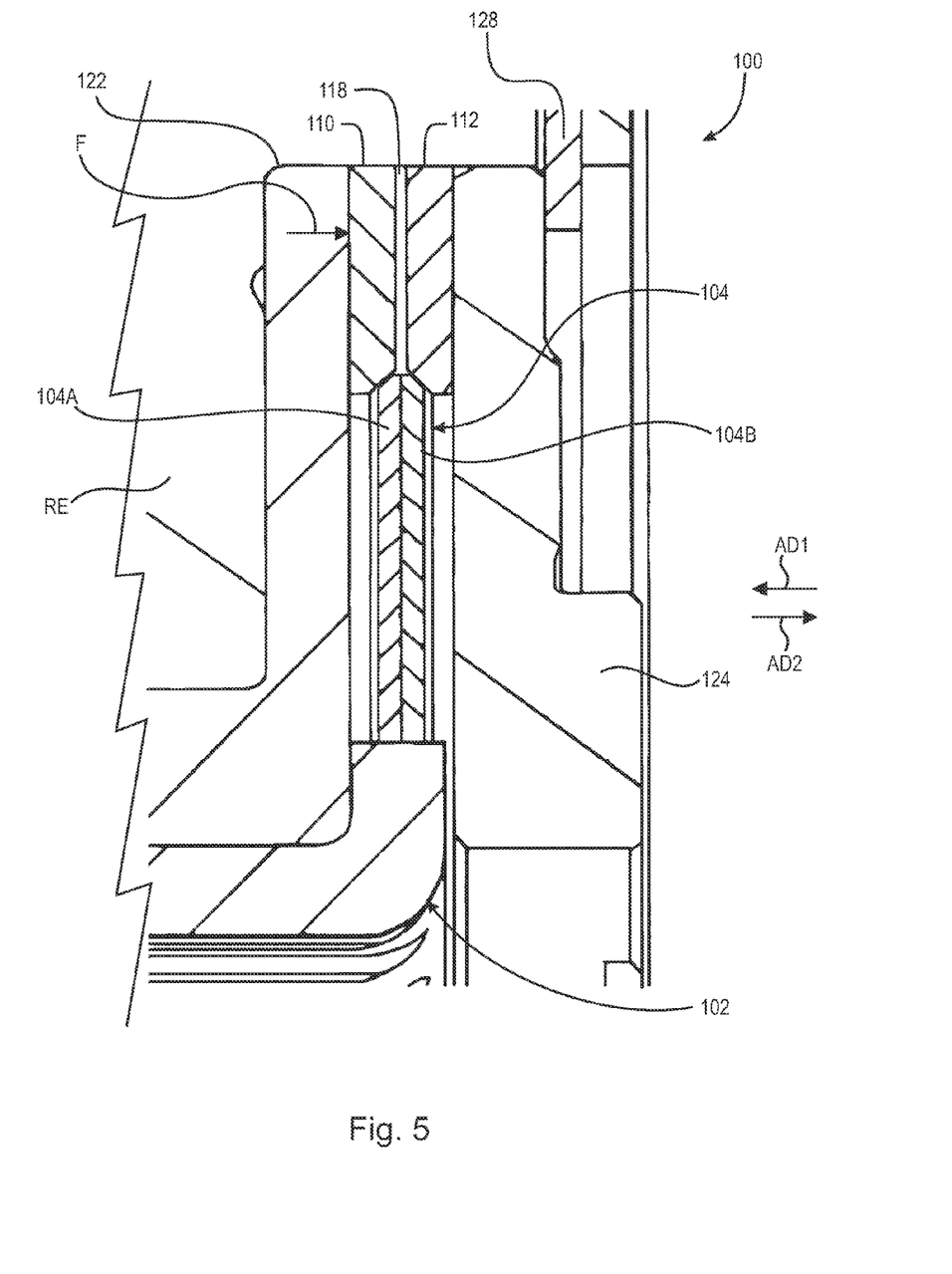
FIG. 5 is a partial cross-sectional view of the one-way clutch of FIG. 3 in a final phase of a locking mode.

FIG. 5 is a partial cross-sectional view of one-way clutch 100 of FIG. 3 in a final phase of a locking mode. The following should be viewed in light of FIGS. 2 through 5. As the wedge component rotates further in direction RD1, the wedge component further displaces rotationally with respect to the inner race and further displaces radially outward, increasing RF. Due to the further radially outward displacement of the wedge component, OCS1 and OCS2 slide radially outwardly along ICS2 and ICS3, respectively, forcing races 110 and 112 to displace in directions AD1 and AD2, respectively, increasing space 118. In an example embodiment, clutch 100 includes axially fixed stop 128, for example, a snap ring. In the final phase of the locking mode, the wedge plates have rotated a maximum amount with respect to the inner race, the vector portion of RF on side plate 122 in direction AD1 is in equilibrium with force F. In addition, side plate 124 is in contact with the axial stop and the wedge component has rotated a maximum amount with respect to generate a maximum level for RF rotationally locking the inner and outer races. In an example embodiment, in the locking mode, the inner and outer races are rotationally fixed, that is, neither the inner race nor the outer races are rotatable. In an example embodiment, in the locking mode, the inner and outer races rotate in unison. It should be understood that any maximum amount noted above is relative to particular operating conditions and is not an absolute value. For example, respective values for RF and respective displacements of the wedge component and outer races can vary according to specific configurations and specific torque loads applied to the clutch.

In an example embodiment, the wedge component includes separate wedge plates 104A and 104B. Wedge plate 104A includes portion ICS1-A of ICS1, surface 106, and OCS1. Wedge plate 104B includes portion ICS1-B of ICS1, surface 108, and OCS2. In an example embodiment, portions ICS1-A and ICS1-B include ramps 130 tapering radially outward in a circumferential direction, for example RD1. The taper increases radial distance RDIS1 of ICS1 with respect to axis of rotation AR for the clutch in direction RD1. Outer circumferential surface OCS3 of the inner race includes ramps 132 tapering in the same circumferential direction to increase radial distance RDIS2 of ICS1 with respect to axis AR. In the free-wheel mode, ramps 130 and 132 are at least nominally engaged and the wedge plates and the inner race rotate in unison (or are both rotationally fixed).

As the locking mode is initiated OCS1 and OCS2 contact ICS2 and ICS3 causing the wedge plates to rotate, for example in direction RD1, with respect to the inner race. Ramps 130 and 132 are tapered such that the rotation of the wedge plates in the lock-up mode direction causes ramps 130 to "ride up" ramps 132, that is, ramps 130 are pushed radially outward by the radially outward tapering of ramps 132, which results in the radially outward displacement of the wedge component noted above.

In general, clutch 100 is arranged for use with another component including element RE. In an example embodiment, element RE is rotatable, and the side plates are non-rotatably connected to RE such that rotation of the outer races is fixed to rotation of RE. Force F, displacing one of the side plates to initiate the locking mode is generated by RE and the operation of the other component. For example, clutch 100 can be installed in an automotive transmission and F is generated by the transmission. In this case, the inner race can function as one rotatable component of the transmission and RE as another rotating component of the transmission. Thus, both the inner and outer races are rotatable and the free-wheel and locking modes are triggered by relative rotation of the inner and outer races with respect to each other. In an example embodiment, element RE is rotationally fixed. For example, in a transmission, RE is rotationally fixed to a case for the transmission and clutch 100 acts as a brake to rotationally lock the wedge component, which could be connected to a component of a gear for the transmission.

Figure 6:
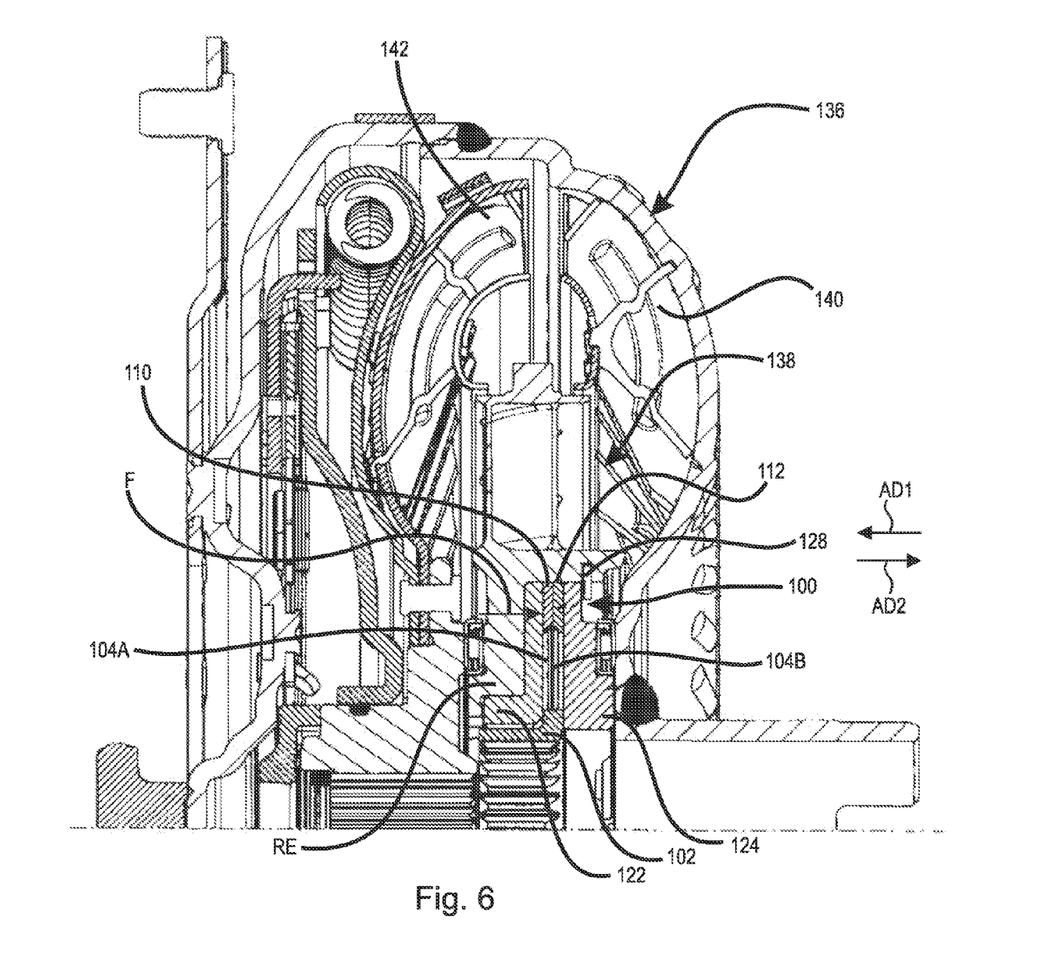
FIG. 6 is a partial cross-sectional view of a one-way clutch with a split outer race installed in a torque converter.

FIG. 6 is a partial cross-sectional view of one-way clutch 100 with a split outer race installed in torque converter 136. The following should be viewed in light of FIGS. 2 through 6. In FIG. 6, clutch 100 is installed in torque converter 136 including stator 138, pump 140, and turbine 142. As is known in the art, inner race 102 is rotationally fixed. In this example, RE is a portion of the stator. The operation of the torque converter requires the stator to freely rotate with respect to the inner race in the free-wheel mode (for example, in torque converter coast mode), and to be rotationally locked with respect to the inner race in the locking mode (for example in torque converter mode). When the torque converter begins operation in torque converter mode, hydrostatic forces generated by the pump and the turbine cause the stator and RE to displace in direction AD2, generating force F on side plate 122 as described above. As noted above, force F is balanced and side plate 124 is in contact with axial stop 128 when the locking mode reaches a final phase.

When the torque converter moves out of the torque converter mode, the axial forces on the side plates are substantially balanced such that side plates 122 and 124 attain the positions shown in FIG. 3 (no contact between the inner and outer races).

In FIG. 2, stator 138 is shown. Note that in FIG. 2, ancillary part AC is shown. AC is related to the particular application including stator 138 and is not a part of clutch 100.

Figure 7:
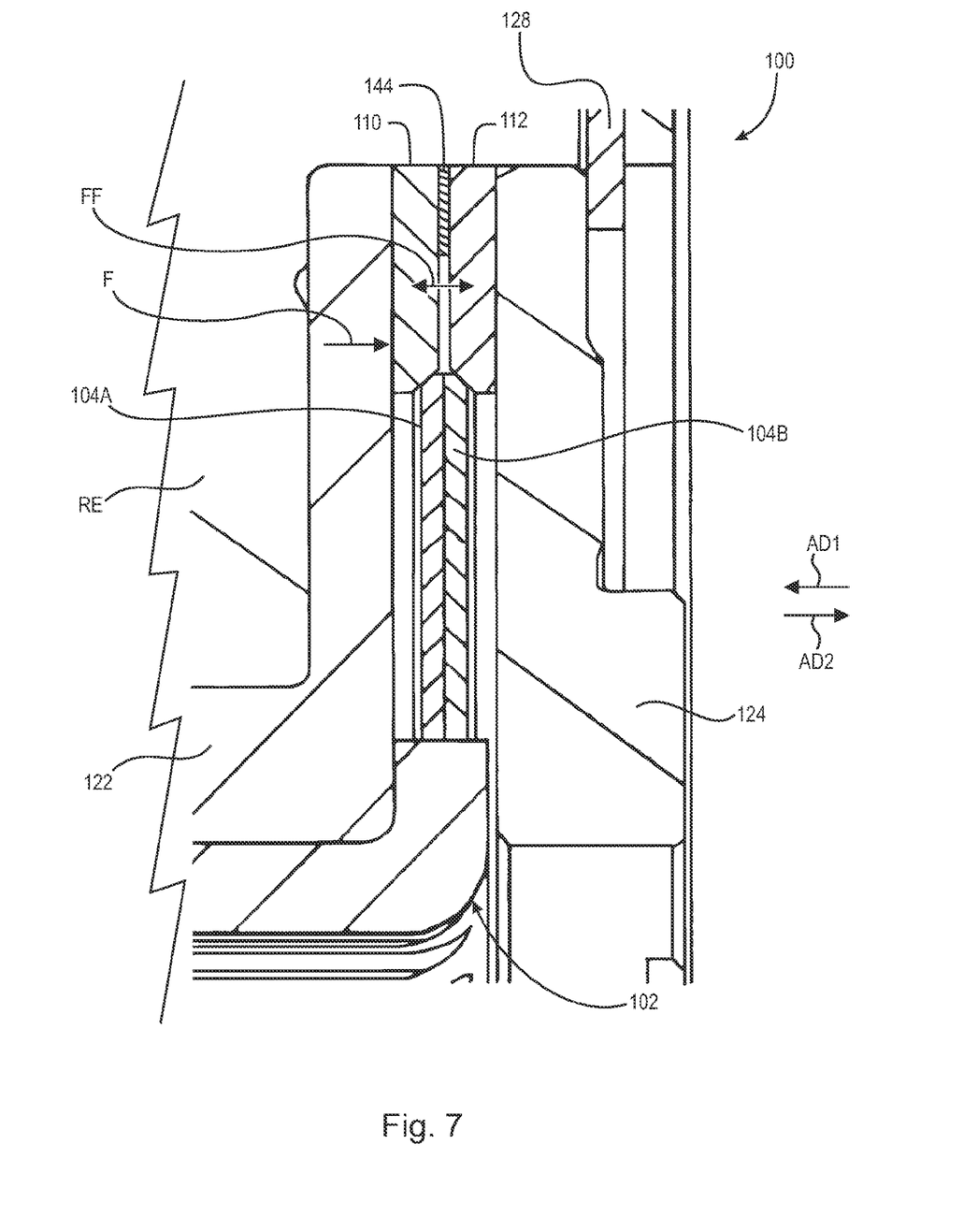
FIG. 7 is a partial cross-sectional view of the one-way clutch of FIG. 3 with a resilient element in a locking mode; and, FIG. 8 is a partial cross-sectional view of a prior art one-way clutch.

FIG. 7 is a partial cross-sectional view of one-way clutch 100 of FIG. 3 with resilient element 144. The following should be viewed in light of FIGS. 2 through 7. In an example embodiment, clutch 100 includes resilient element 144 axially located between the outer races and urging the outer races away from each other with force FF. For example, the resilient element urges race 110 in direction AD1 and race 112 in direction AD2. Resilient element 144 ensures that for the transition from the locking mode to the free-wheel mode, the outer races axially separate such that contact is broken between the wedge component and the outer races. Force FF is selected such that force F can overcome FF as needed to initiate the locking mode, and the configuration of the resilient element is such that the wedge component is able to axially separate the outer races as shown in FIG. 5.

Clutch 100 advantageously eliminates the torque drag in free-wheel mode described above. For example, the two axially displaceable outer races are axially separated in the free-wheel mode to provide clearance between the wedge component and the outer races and are axially drawn together to initiate the locking mode. The ability to axially separate the outer races in the final phase of the locking mode enhances the compressive and frictional forces locking the wedge component to the outer races, and subsequently, the outer races to the inner race.

At the same time, clutch 100 provides consistent and dependable transition from free-wheel to locking mode. Specifically, force applied to the outer races by the side plate to initiate the locking mode is reliably, predictably, and consistently generated from operation of a component in which clutch 100 is installed, for example, the hydrostatic forces described for FIG. 6. Thus, force F ensures a positive and repeatable engagement of the inner circumferential surfaces of the outer races with the outer circumferential surfaces of the wedge plates. This engagement causes the rotational displacement of the wedge plates, with respect to the inner race, needed to initiate the locking mode.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A one-way clutch, comprising:
    an inner race;
    a wedge component with:
        first and second radially disposed sides, respectively, facing away from each other in first and second opposite axial directions;
        a first inner circumferential surface engaged with the inner race; and,
        first and second outer partially circumferential surfaces:
            facing partially in a first radial direction and partially in the first or second axial direction; and,
            tapering radially outward from the first and second radially disposed sides, respectively; and,
    first and second axially displaceable outer races including:
        third and fourth radially disposed sides, respectively, facing in the second and first axial directions, respectively; and,
        second and third inner partially circumferential surfaces, respectively:
            facing partially in a second radial direction and partially in the first or second axial direction; and,
            tapering radially inward from the third and fourth radially disposed sides, respectively, wherein:
        for a free-wheel mode:
            rotation of the first and second outer races, with respect to the inner race, is in a first rotational direction;
            the first and second outer races are axially aligned and separated by a space in an axial direction;
            the first outer partially circumferential surface and the second inner partially circumferential surface are at least partially aligned in radial and axial directions; and,
            the first and second outer partially circumferential surfaces and the second and third inner partially circumferential surfaces, respectively, are free of contact;
        for an initial phase of a locking mode:
            rotation of the first and second outer races, with respect to the inner race, is in a second rotational direction, opposite the first rotational direction;
            the first and second outer partially circumferential surfaces contact the second and third inner partially circumferential surfaces;
            a distance, in the first axial direction, between the first and second outer races has a first magnitude; and,
        for a final phase of the locking mode:
            the first and second outer races are non-rotatably connected to the inner race; and,
            the distance has a second magnitude greater than the first magnitude.

2. The one-way clutch of claim 1 further comprising a first side plate, wherein for rotation of the first and second outer races, with respect to the inner race, in the second rotational direction, the first side plate urges the first outer race axially toward the second outer race to bring the first and second outer partially circumferential surfaces into contact with the second and third inner partially circumferential surfaces, respectively.

3. The one-way clutch of claim 2, further comprising:
a plurality of fasteners connecting the first outer race to the first side plate, wherein the first outer race is axially slideable along the plurality of fasteners.

4. The one-way clutch of claim 1, further comprising first and second side plates, wherein:
the first and second outer races are axially disposed between the first and second side plates;
the first outer race is rotationally and radially fixed with respect to the first side plate and axially displaceable with respect to the first side plate; and,
the second outer race is rotationally and radially fixed with respect to the second side plate and axially displaceable with respect to the second side plate.

5. The one-way clutch of claim 4, wherein the first and second side plates are arranged to non-rotatably connect to a stator for a torque converter.

6. The one-way clutch of claim 4, wherein:
the inner race is a first component of a transmission; and,
the first and second side plates are arranged to non-rotatably connect to a second component of the transmission.

7. The one-way clutch of claim 1 further comprising a first side plate, wherein for rotation of the first and second outer races, with respect to the inner race, in the second rotational direction, the first side plate urges the first outer race in the second axial direction:
to contact the first and second outer partially circumferential surfaces with the second and third inner partially circumferential surfaces, respectively; and,
such that the wedge component displaces radially outward.

8. The one-way clutch of claim 1 further comprising first and second axially displaceable side plates, wherein:
the first and second outer races and the wedge component are axially located between the first and second side plates; and,
for rotation of the first and second outer races, with respect to the inner race, in the second rotational direction:
the first side plate urges the first outer race in the second axial direction such that:
the first and second outer partially circumferential surfaces contact the second and third inner partially circumferential surfaces, respectively; and,
the wedge component displaces radially outward; and,
the outward displacement of the wedge component displaces the first side plate in the first axial direction and the second side plate in the second axial direction.

9. The one-way clutch of claim 8, further comprising an axially fixed stop, wherein the outward displacement of the wedge component displaces the second side plate in the second axial direction such that the second side plate contacts the axially fixed stop.

10. The one-way clutch of claim 1 further comprising a resilient element axially located between the first and second outer races and urging the first and second outer races in the first and second axial directions, respectively.

11. The one-way clutch of claim 1 wherein:
the wedge component includes first and second wedge plates;
the first wedge plate includes a first portion of the first inner circumferential surface, the first radially disposed side and the first outer partially circumferential surface; and,
the second wedge plate includes a second portion of the first inner circumferential surface, the second radially disposed side, and the second outer partially circumferential surface.

12. The one-way clutch of claim 11 wherein:
the first and second portions of the first inner circumferential surface include first and second pluralities of ramps, respectively;
the inner race includes a third plurality of ramps; and,
for rotation of the first and second outer races, with respect to the inner race, in the second rotational direction, the first and second pluralities of ramps slide along the third plurality of ramps.

13. A one-way clutch, comprising:
a first side plate;
an inner race;
a wedge component with:
first and second radially disposed sides, respectively, facing away from each other in first and second opposite axial directions;
a first inner circumferential surface engaged with the inner race; and,
first and second outer partially circumferential surfaces:
facing partially in a first radial direction and partially in the first or second axial direction; and,
tapering radially outward from the first and second radially disposed sides, respectively; and,
first and second axially displaceable outer races including:
respective portions located radially outward of the inner race;
third and fourth radially disposed sides, respectively, facing in the second and first axial directions, respectively; and,
second and third inner partially circumferential surfaces, respectively:
facing partially in a second radial direction and partially in the first or second axial direction; and,
tapering radially inward from the third and fourth radially disposed sides, respectively, wherein:
for a free-wheel mode:
rotation of the first and second outer races, with respect to the inner race, is in a first rotational direction; and,
the first and second outer partially circumferential surfaces and the second and third inner partially circumferential surfaces, respectively, are free of contact;
for an initial phase of a locking mode:
rotation of the first and second outer races, with respect to the inner race, in a second rotational direction, opposite the first rotational direction; and,
the first side plate urges the first outer race axially toward the second outer race in the second axial direction such that:
the first and second outer partially circumferential surfaces and the second and third inner partially circumferential surfaces are in contact;
the wedge component rotates with respect to the inner race; and,
for a final phase of the locking mode:
the wedge component displaces radially outward to rotationally lock the inner race to the first and second outer races;
the inner race and the first and second outer races are rotationally locked; and,
the wedge component displaces further, radially outward, to displace the first side plate and the first outer race in the first axial direction.

14. The one-way clutch of claim 13 further comprising a second axially displaceable side plate, wherein:
   the first and second outer races and the wedge component are axially located between the first and second side plates; and,
   for rotation of the first and second outer races, with respect to the inner race, in the second rotational direction, the outward displacement of the wedge component displaces the second side plate in the second axial direction.

15. The one-way clutch of claim 14, further comprising an axially fixed stop, wherein the outward displacement of the wedge component displaces the second side plate in the second axial direction such that the second side plate contacts the axially fixed stop.

16. The one-way clutch of claim 14,
   wherein the first and second side plates are arranged to non-rotatably connect to a stator for a torque converter; or,
   wherein:
      the inner race is a first component of a transmission; and,
      the first and second side plates are arranged to non-rotatably connect to a second component of the transmission.

17. The one-way clutch of claim 13 further comprising a resilient element axially located between the first and second outer races and urging the first and second outer races in the first and second axial directions, respectively.

18. The one-way clutch of claim 13, further comprising:
   a plurality of fasteners connecting the first outer race to the first side plate, wherein the first outer race is axially slideable along the plurality of fasteners.

19. A one-way clutch, comprising:
   an inner race;
   a wedge component with:
      a first inner circumferential surface engaged with the inner race; and,
      first and second outer partially circumferential surfaces tapering toward each other radially outward;
   first and second axially displaceable outer races including second and third inner partially circumferential surfaces, respectively, tapering toward each other radially outward;
   a side plate; and,
   a plurality of pins fixedly connected to the side plate and passing through the first outer race, wherein:
      the first outer race is axially displaceable along the plurality of pins;
      the plurality of pins rotationally and radially lock the first outer race with respect to the side plate;
      the first and second outer races are arranged to rotate, with respect to the inner race, in a first rotational direction such that the first and second outer partially circumferential surfaces are free of contact with the second and third inner partially circumferential surfaces; and,
      for a locked mode, the first and second outer races are arranged to rotate, with respect to the inner race, in a second rotational direction opposite the first rotational direction such that:
         the first and second outer partially circumferential surfaces contact the second and third inner partially circumferential surfaces; and,
         the first and second outer races are non-rotatably connected to the inner race.

* * * * *